United States Patent
Bates et al.

(10) Patent No.: US 7,043,721 B2
(45) Date of Patent: May 9, 2006

(54) INITIAL OBJECT CAPACITY DETERMINATION

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 10/100,345

(22) Filed: Mar. 18, 2002

(65) Prior Publication Data

US 2003/0177478 A1    Sep. 18, 2003

(51) Int. Cl.
    *G06F 9/45*    (2006.01)
(52) U.S. Cl. .............. 717/140; 717/108; 717/116; 717/151
(58) Field of Classification Search ........... 717/108, 717/116, 128, 139, 140, 141, 136, 155, 165, 717/151, 154, 162; 707/100
See application file for complete search history.

(56) References Cited

U.S. PATENT DOCUMENTS

| | | | | |
|---|---|---|---|---|
| 5,357,603 | A * | 10/1994 | Parker | 345/765 |
| 5,535,391 | A * | 7/1996 | Hejlsberg et al. | 717/140 |
| 5,724,492 | A * | 3/1998 | Matthews et al. | 345/419 |
| 5,778,227 | A * | 7/1998 | Jordan | 707/103 R |
| 5,809,306 | A * | 9/1998 | Suzuki et al. | 717/143 |
| 5,907,847 | A * | 5/1999 | Goldberg | 707/103 R |
| 6,035,125 | A * | 3/2000 | Nguyen et al. | 717/160 |
| 6,106,574 | A * | 8/2000 | Baisley et al. | 717/140 |
| 6,145,121 | A * | 11/2000 | Levy et al. | 717/135 |
| 6,298,481 | B1 * | 10/2001 | Kosaka et al. | 717/110 |
| 6,317,872 | B1 * | 11/2001 | Gee et al. | 717/152 |
| 6,360,360 | B1 | 3/2002 | Bates et al. | 717/140 |
| 6,601,234 | B1 * | 7/2003 | Bowman-Amuah | 717/108 |
| 6,625,804 | B1 * | 9/2003 | Ringseth et al. | 717/114 |
| 6,658,653 | B1 * | 12/2003 | Bates et al. | 717/131 |
| 6,671,800 | B1 * | 12/2003 | McInally et al. | 713/1 |
| 6,675,378 | B1 * | 1/2004 | Schmidt | 717/154 |
| 6,694,507 | B1 * | 2/2004 | Arnold et al. | 717/108 |
| 6,721,941 | B1 * | 4/2004 | Morshed et al. | 717/127 |

OTHER PUBLICATIONS

TITLE: Complier Optimization and its impact on development of real-time systems, author. Tucker, IEEE, 1998.*
TITLE: Escape analysis for object-oriented languages. Application to Java™, author: Blanchet, ACM, 1999.*
TITLE: Vortex: An Optimizing compiler for object-oriented languages, author: Dean et al, ACM, 1996.*

* cited by examiner

*Primary Examiner*—Chameli C. Das
(74) *Attorney, Agent, or Firm*—Patterson & Sheridan, LLP (57) ABSTRACT

The present invention generally provides a method, apparatus, and article of manufacture whereby source code is analyzed by the compiler to determine if a default object capacity should change. In one embodiment of the invention, the compiler determines an initial object capacity based upon the use of a particular consumption method against an object created in the source code.

25 Claims, 6 Drawing Sheets

FIG. 1

| Obj Type Name | Consumption Method List | Default Value | ValueUse | Valueloop nest | Valueuse number | Valuetotal bytes |
|---|---|---|---|---|---|---|
| String | += ( String& s )<br>+= (char* s) | 100 | 400 | 100* 4 *loopnest | 100* use# | totalbytes |
| ... | ... | ... | ... | ... | ... | ... |

INITIAL OBJECT CAPACITY DETERMINATION

BACKGROUND OF THE INVENTION

1. Field of the Invention

The present invention generally relates to the field of computer programs, compilers, and object-oriented programming.

2. Description of the Related Art

Computer programs are constructed using one or more programming languages. A computer programmer first drafts a source code (i.e., a computer program) in human-readable form. The computer programmer then uses a compiler to convert the source code into a machine-readable form called object code. The compiler may reside within the memory of the computer that will be used to execute the object code, or it may reside on a separate computer system.

Many types of programming languages are used by computer programmers to create source code. Some exemplary programming types include an aspect-oriented programming, a functional programming, and an objected-oriented programming. Object-oriented programming languages (OOP) are organized around an object rather than an action, as in procedural languages. The object is a self-contained collection of data and its associated processing language. Examples of OOP languages include the Java® and C++ programming languages.

The first step in the OOP is to identify all the objects one desires to manipulate and determine how those objects relate to each other, often known as data modeling. Once one has identified the object, one generalizes it as a class and defines the type of data the class may contain and any logical sequences that may manipulate it. The class is a set of objects that share a common structure and behavior. The structure of the class is determined by a class variable which represents the state of an object of that class, with the behavior given by a set of methods associated with the class. A real instance of a class is called an "object" or, in some environments, a "class instance." The object or class instance is what is run while executing a program in the computer. The object's methods provide computer instructions, while the class object characteristics provide relevant data. Communication with objects is done with well-defined interfaces called messages.

During programming, the computer programmer creates objects by instantiating (declaring) them. Upon creation, the object may either be a default size or a size determined by the computer programmer. However, many objects in the OOP are expandable. In other words, if, during execution of a program, the object reaches its size limitation, it may automatically expand itself to a larger size to accommodate its need. The Java® programming language, in particular, has several classes of objects that allow instances of the objects themselves to be automatically expanded. Examples of these classes include StringBuffer and Vector. Automatic expansion of the object is inherently problematic as the underlying code has no manner of determining how much to increase the object's size. Thus, the typical default expansion is double. The object is expanded by the program creating a new object, twice as large as the object being expanded. The program then copies all the data from the old object into the new object.

The expansion process sometimes leads to an over-allocation of space to the object. For example, suppose the initial object size is 40-bytes, and all the allocated space contains data. If the program needs to place more information in the object, expansion must occur, doubling the object to 80-bytes. If this process continues, the object will continue to expand from 80-bytes to 160-bytes to 320-bytes to 640-bytes, etc. If the object is full at 640-bytes, but the program needs to place one more byte of data in the object, the object must be doubled (to 1240-bytes), just to accommodate one single byte, essentially a waste of 630-bytes. Additionally, there is a waste of the time it takes to copy the data to the new object, and that missing bytes in the data causes cache misses to occur more often, wasting computer processor cycles.

Therefore, there is a need for a method or system that permits source code to be analyzed to determine if the default object capacity should be changed.

SUMMARY OF THE INVENTION

The present invention generally provides a method, apparatus, and article of manufacture whereby source code is analyzed by the compiler to determine if a default object capacity should change. In one embodiment of the invention, the compiler determines an initial object capacity based upon the use of a particular consumption method against an object created at a line in the source code.

In a particular embodiment, a method of compiling object-oriented source code, comprises compiling, by a compiler, object-oriented code comprising objects each having at least one associated method; and while compiling the object-oriented code, determining whether a size of each of the objects should be changed. Further embodiments include a computer readable medium containing a compiler and a computer configured with a compiler, which, when executed, performs the foregoing method.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention is a method in which source code is analyzed by the compiler to determine if a default object capacity should change. In one embodiment of the invention, the compiler determines an initial object capacity based upon the use of a particular consumption method against an object created at a line in the source code. The consumption method is a method associated with an object, such that, when invoked, it consumes object storage leading to the need to expand the object. The initial object capacity refers to the size of the object upon compilation of the source code. The default object capacity refers to the size of an object that is generically given prior to compilation.

One embodiment of the invention is implemented as a program product for use with a computer system such as, for example, the computer 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
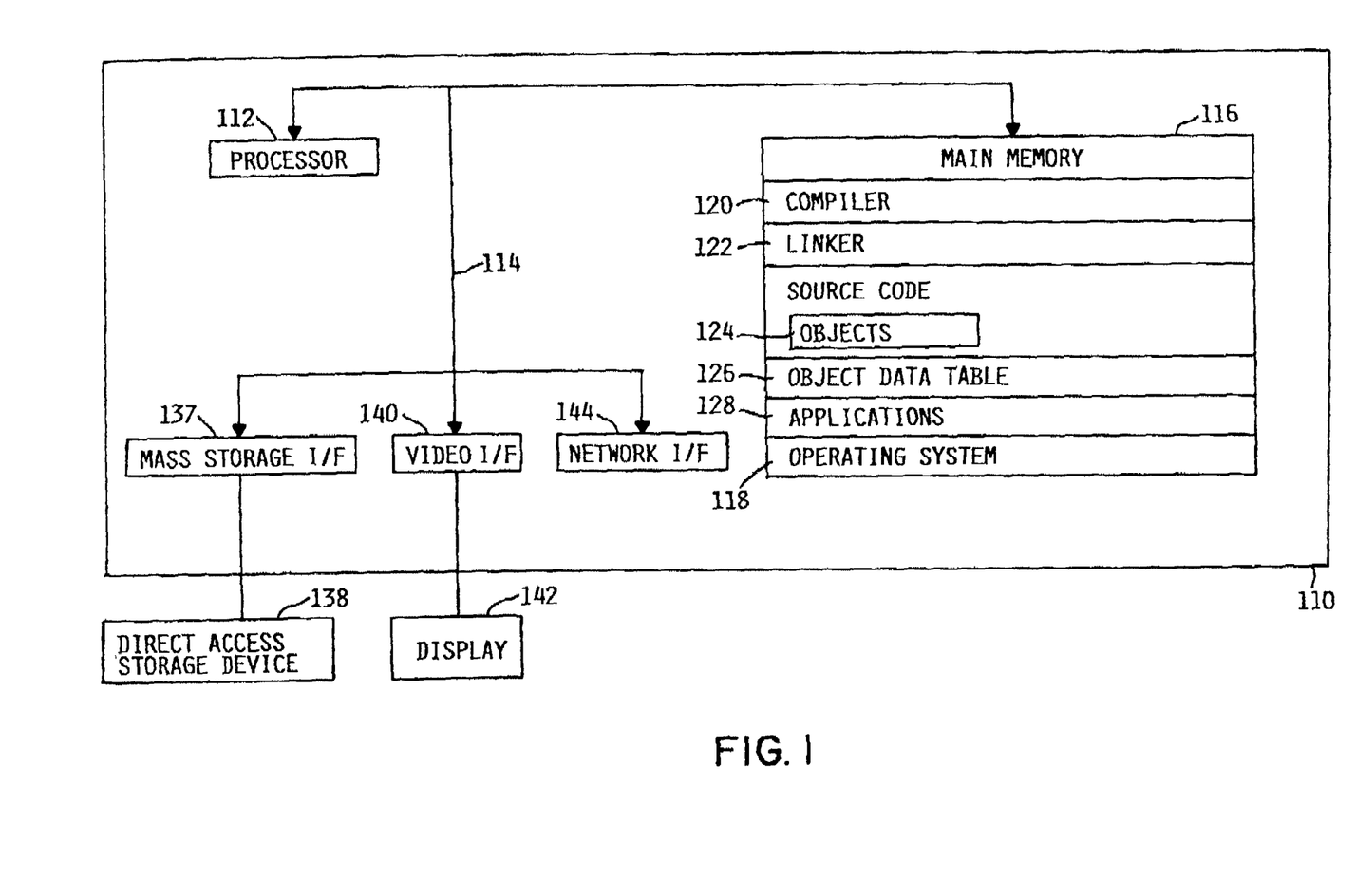
FIG. 1 illustrates a computer system upon which the invention may be implemented.

Referring now to FIG. 1, a computer system 110 suitable for use in an object-oriented environment is shown. The computer system 110 may represent or include any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. Illustratively, the computer system 110 is a standalone device; however, in other embodiments, the computer system 110 is part of a networked system. In this regard, the invention may be practiced in a distributed computing environment in which tasks are performed by remote processing devices that are linked through a communications network. In a distributed computing environment, program modules may be located in both local and remote memory storage devices.

In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The computer system 110 could include a number of operators and peripheral systems as shown, for example, by a mass storage interface 137 operably connected to a direct access storage device 138, by a video interface 140 operably connected to a display 142, and by a network interface 144 which may be operably connected to one or more networked devices (not shown). The display 142 may be any video output device for outputting viewable information.

Computer system 110 is shown comprising at least one processor 112, which obtains instructions, or operation codes, (also known as opcodes), and data via a bus 114 from a main memory 116. The processor 112 could be any processor adapted to support the debugging methods of the invention. In particular, the computer processor 112 is selected to support the features of the present invention. Illustratively, the processor is a PowerPC® processor available from International Business Machines Corporation of Armonk, New York.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer system 110 via bus 114.

As shown, the main memory 116 includes an operating system 118. The operating system 118 may be any suitable operating system capable of supporting the functions of the present invention. One operating system which may be used to advantage is Linux. Also shown resident in main memory 116 is a compiler 120, a linker 122, objects 124, an object data table 126, and application programs 128. The compiler 120 is generally configured for translating source code into machine code (in the form of object code). The object code is then linked (also referred to as "bound") together by the linker 122 to form a program (represented by the objects 124 and the application programs 128).

Figure 2:
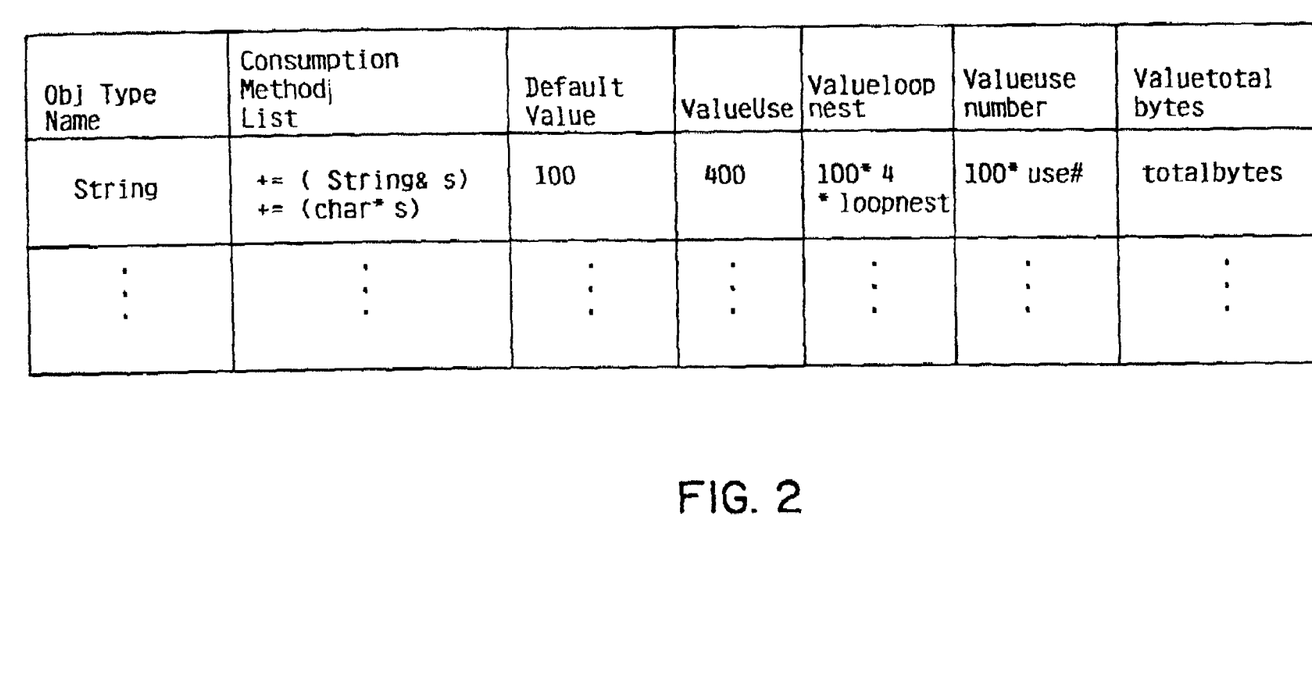
FIG. 2 illustrates an object data table.

During an optimization stage of compilation, the compiler is generally configured to determine whether any attributes of the objects 124 indicate that the size of the object should be increased from a default value. For example, illustrative object types may include string, array, number, and etc., depending upon the programming language and class libraries being used. In one embodiment, the object data table 126 is used by the compiler 120 during the optimization stage. One embodiment of the object data table 126 is shown in FIG. 2. In general, the table 126 is organized as a plurality of columns and rows, where each column is particular to a category and each row defines a record containing various entries for each of the columns. The illustrative columns include an object type column 202, a consumption method list column 204, a default value column 206, a ValueUse column 208, a ValueLoopNest column 210, a ValueUseNumber column 212, and a ValueTotalBytes column 214. ValueUse column 208, ValueLoopNest column 210, ValueUseNumber column 212, and ValueTotalBytes column 214 contain computations associated with the particular object types signified in the object type column 202. Although only one record is shown, it is understood that a number of records may exist within the table 126 at any time. In one embodiment of the invention, the object data table 126 is populated by the user assigning object types to the object type column 202, and computations for the default value column 206, the ValueUse column 208, the Value-LoopNest column 210, the ValueUseNumber column 212, and the ValueTotalBytes column 214. In another embodiment of the invention, the object data table 126 is hard-coded to handle particular object types known by the compiler.

In one embodiment of the invention, the consumption method is a directive that computes an initial object capacity value to replace the default object capacity. Exemplary consumption method directives of one embodiment of the invention are defined herein as ValueTotalBytes, ValueUseNumber, ValueLoopNest, and ValueUse. One skilled in the art may recognize that these consumption method directives are merely illustrative and other consumption method directives may exist. ValueTotalBytes computes a new object capacity value based on the total amount of data passed through a particular argument of the object specified in the parentheses. ValueUseNumber computes a new object capacity value based on the number of times the methods are called. ValueLoopNest computes a new object capacity value based on the maximal loop depth for which one of the methods is called using the particular object. ValueUse computes a new object capacity value based on the use of a method against a particular object. Persons skilled in the art may recognize that the foregoing consumption method directives are merely illustrative and that other consumption method directives are contemplated.

When the compiler encounters an object creation statement, it uses dataflow analysis to follow the object and determine which consumption methods are used against the object. For the first consumption method determined by the compiler to be used, the default size value of the object is changed to a capacity allocation as computed by that particular consumption method.

Figure 3:
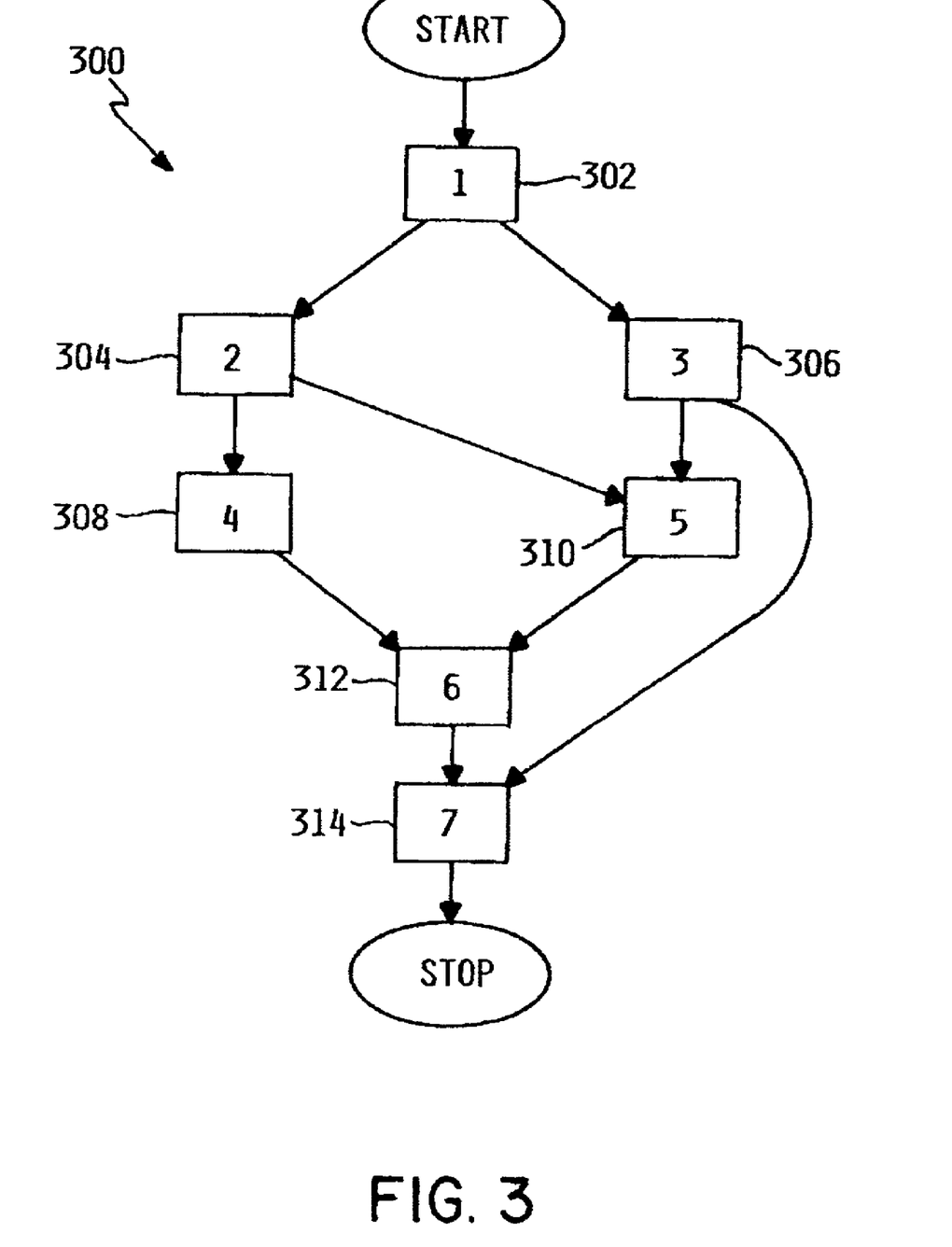
FIG. 3 illustrates a control flow graph.

In some embodiments described herein, reference is made to a control flow graph (CFG) constructed by the compiler 120. Control flow graphs are well-known in the art and a detailed discussion is not needed. However, a control flow graph 300 will be briefly described with reference to FIG. 3. In general, the CFG 300 illustrates program flow from one basic program block to another basic block. As shown, in some instances, a basic block may have more than one possible path. For example, Block 302 may branch to either Block 304 or Block 306 depending on the outcome of executing the conditional statement in Block 302. Also, Block 306 may branch to either Block 310 or Block 314. However, according to the example, program execution will always flow from Block 308 to Block 312 and from Block 312 to Block 314. Those skilled in the art will appreciate that even though FIG. 3 Is described in terms of statically compiled and bound languages, these concepts can also be applied to dynamically bound languages such as Java® without deviating from this invention.

Figure 4:
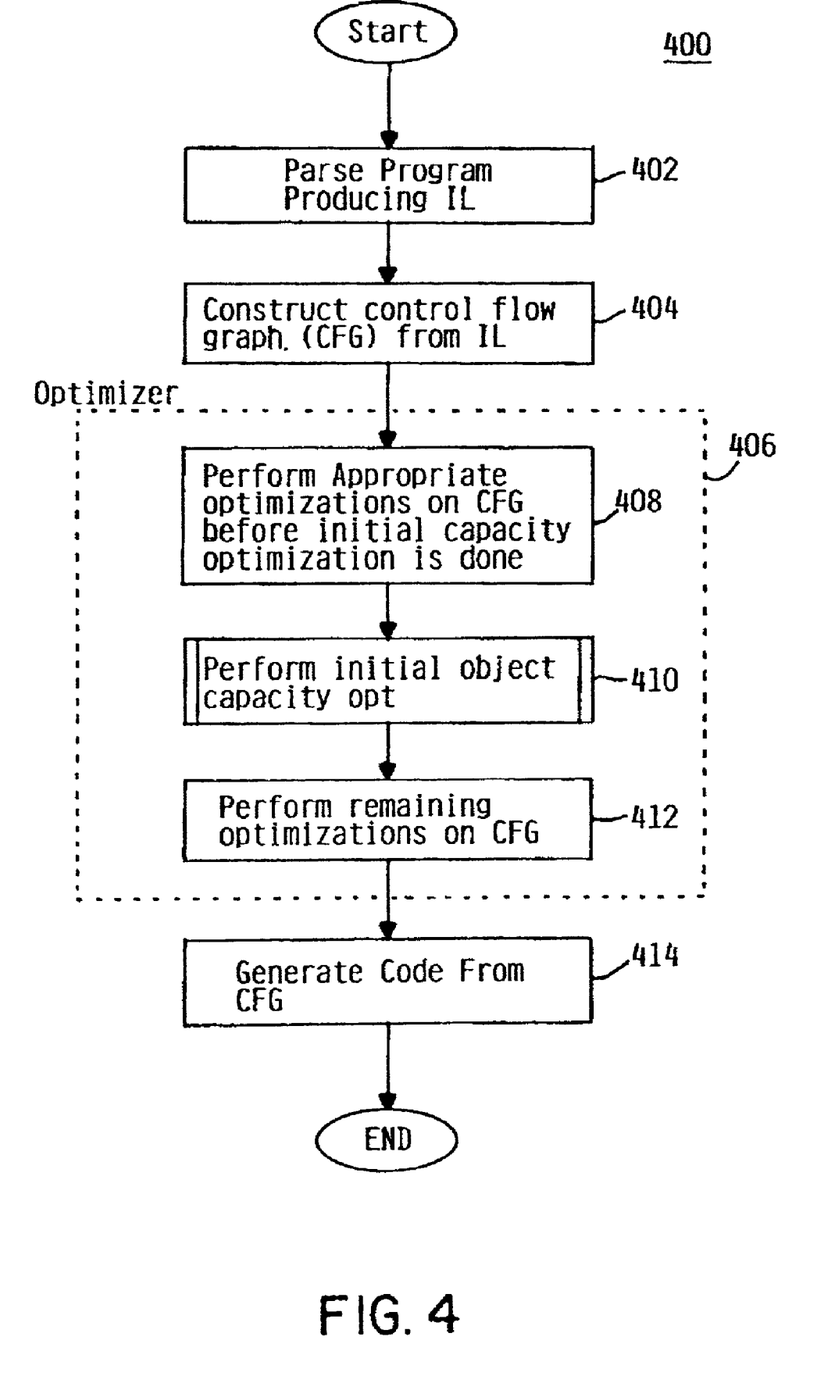
FIG. 4 is an exemplary block diagram illustrating the compilation process of the compiler.

Referring now to FIG. 4, an exemplary block diagram illustrating the compilation process 400 of the compiler 120 is shown. First, the compiler parses the source code to produce intermediate language (step 402). Next, the compiler constructs the CFG from the parsed source code (step 404). The compiler then performs an optimization phase (step 406). Step 406 involves the compiler performing appropriate optimizations on the CFG (step 408), for example, copy propagation which makes some arguments constants to the consumption method. Performing the initial object capacity optimization (step 410), and performing the remaining optimizations on the CFG (step 412). After completion of the initial object capacity optimization (step 406), the compiler generates machine-readable object code from the CFG (step 414).

One embodiment of the invention is seen in APPENDIX. In the exemplary code shown in APPENDIX, the default_value pragma in lines 8, 11, 12, 19, 27, and 34 defines a particular default value for the class called initial_size. The block and endblock functions define which methods the current directive applies to, and the function built into default_value in lines 27–31 is used to set the default value to be used if one of those methods is called, and no other condition is found to over-ride it. ValueUse, ValueLoopNest, ValueUseNumber, and ValueTotalBytes are directives that are used with other methods such that if one of those methods is determined by the compiler to be used against an object created at a particular line in the source code, then the conditions associated with these directives will be tested, and if found to be true, will over-ride the default_value for that object. In other words, the value of the first consumption method determined by the compiler to be used will over-ride the default_value for the object.

Figure 5A:
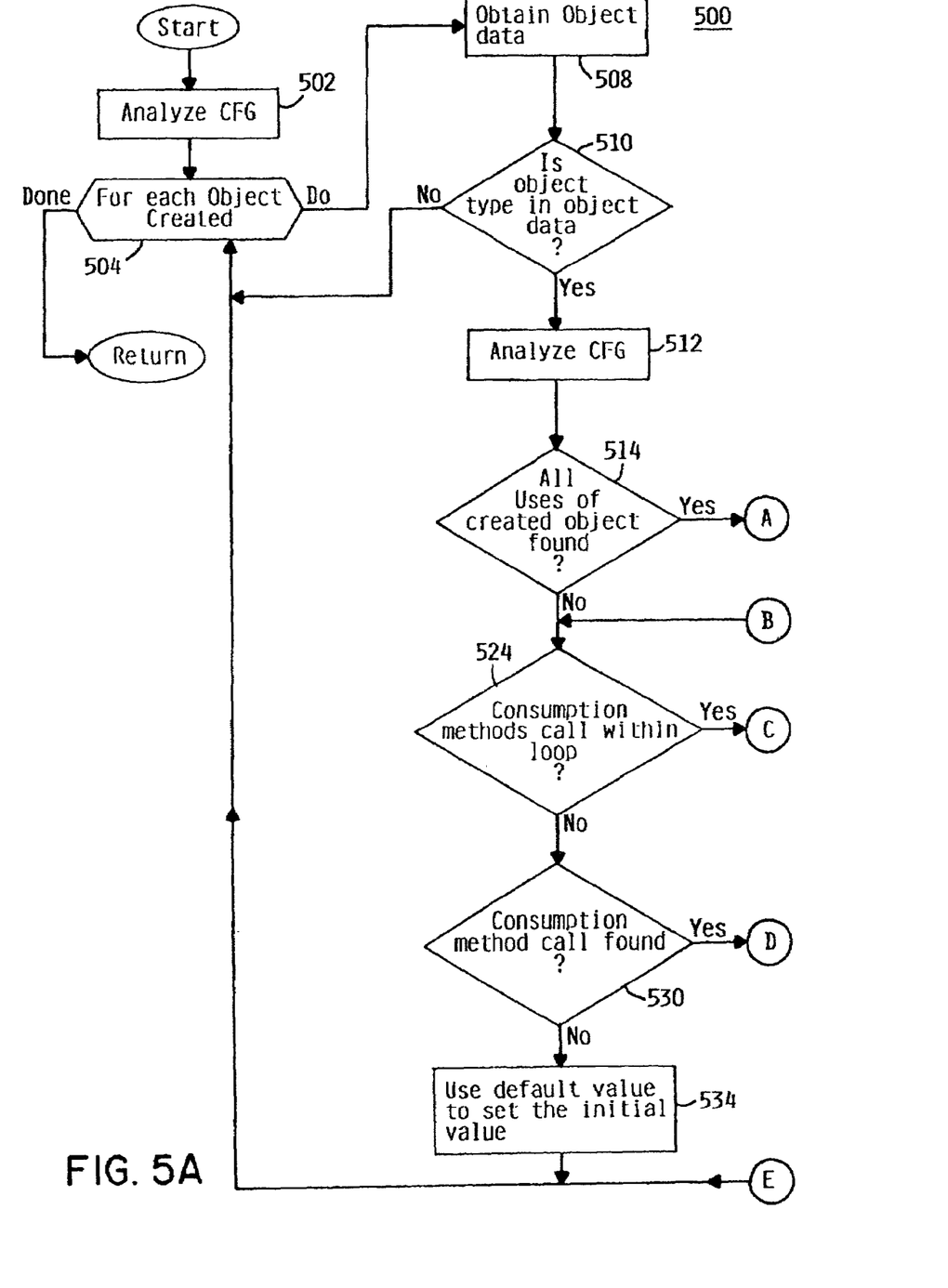
FIGS. 5A and 5B (hereinafter referred to as FIG. 5) illustrate a typical flow process of one embodiment of the initial object capacity optimization.
Figure 5B:
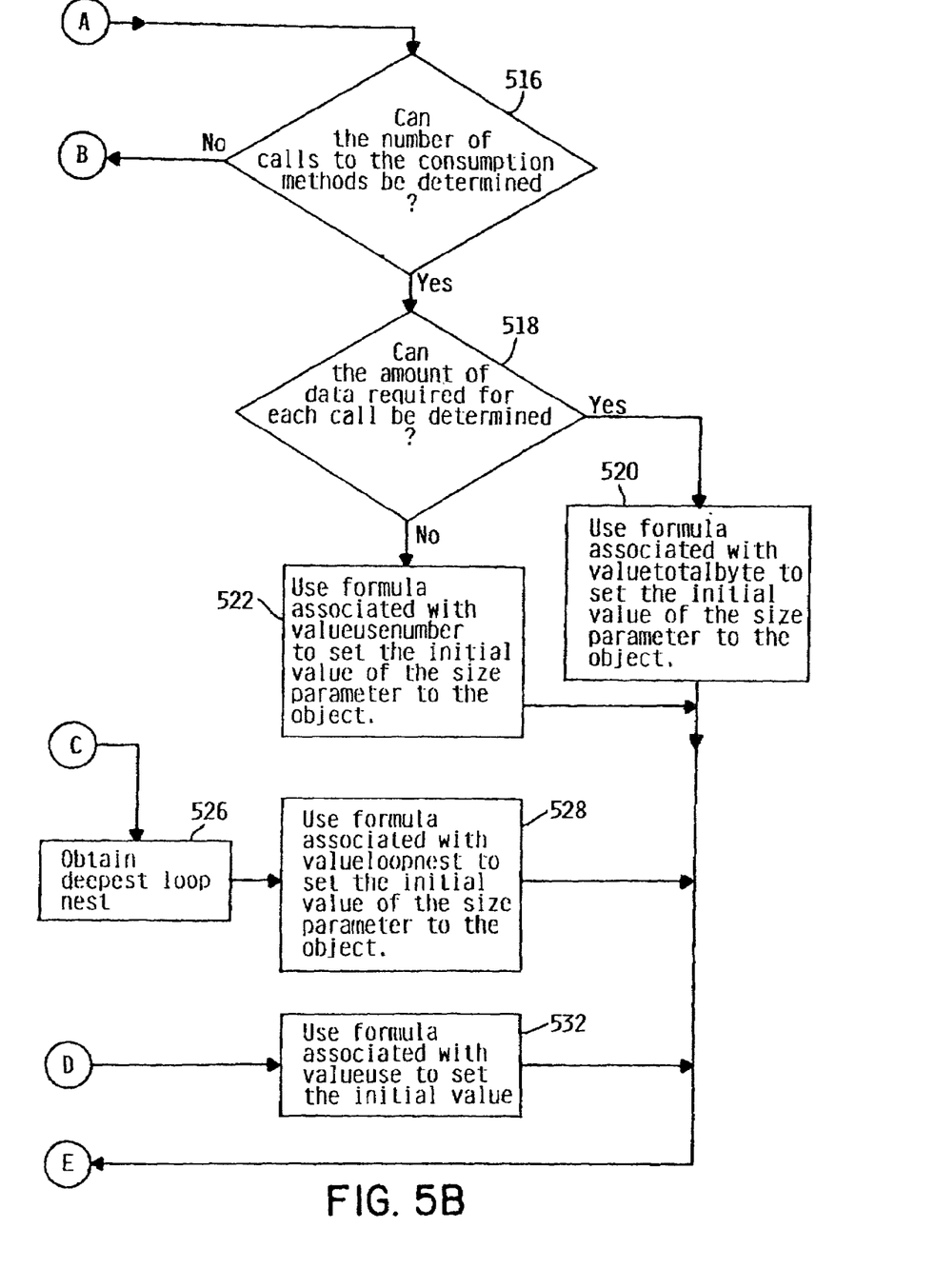

FIG. 5 illustrates a flow process 500 of one embodiment of the initial object capacity optimization of step 406. First, the compiler analyzes the CFG (step 502). For each object created, the object capacity optimization is performed (step 504). Taking the first object it encounters, the compiler obtains the object data (step 508) and compares the object type to the object data table described in FIG. 2. If the object type is not listed in the object data table (step 510), the compiler does not change the default object capacity and completes its analysis of that particular object, moving on to the next object (step 504). If the object type is listed in the object data table (step 510), the compiler continues its analysis of the CFG (step 512). The compiler then determines if all uses of the particular object are found (step 514). If so, the compiler determines whether the number of calls to the consumption methods can be determined (step 516). If so, the compiler determines whether the amount of data required for each call can be determined (step 518). If so, the compiler uses the computational formula associated with ValueTotalBytes to set the initial object capacity (step 520), and continues on to the next object (step 504). If the amount of data required for each call cannot be determined (step 518), the compiler uses the computational formula associated with ValueUseNumber to set the initial object capacity (step 522), and continues on to the next object (step 504). If all uses of the particular object are not found (step 514) or if the number of calls to the consumption methods cannot be determined (step 516), the compiler determines if the consumption methods are called within a loop (step 524). If yes, the compiler obtains the deepest known loop nest (step 526) and uses the computational formula associated with ValueLoopNest to set the initial object capacity (step 528), and continues on to the next object (step 504). If the consumption methods are not found to be called within a loop, the compiler determines if any consumption method call is found (step 530). If yes, the compiler uses the computational formula associated with ValueUse to set the initial object capacity (step 532), and continues on to the next object (step 504). If no consumption method call is found, the compiler uses the default value of the object to set the initial object capacity (step 534), and continues on to the next object (step 504).

In some aspects, an advantage provided by one or more of the embodiments described herein is a more efficient capacity allocation to objects when created by a computer program. Another advantage provided by one or more of the embodiments is that programs may run faster as less processing time will be used to continuously update capacity of objects during the computer program's run-time.

While the foregoing is directed to embodiments of the present invention, other and further embodiments of the invention may be devised without departing from the basic scope thereof, and the scope thereof is determined by the claims that follow.

Appendix

APPENDIX

```
1   #ifndef QTES_STRING_H
2   #define _QTES_STRING_H
3   #include <i0string.hpp>
4   const int YPSSTRING_ALL = -1;
5   class tesString
6   {
7     public:
8   #pragma default_value(initial_size,block,default_value=100)
9       tesString (const tesString &s, int n=initial_size);
10      tesString (const char *s, int n=initial_size);
11  #pragma default_value(initial_size,endblock);
12  #pragma default_value(initial_size,block,default_value=15)
13      tesString (long value, int n=initial_size);
14      tesString (int value, int n=initial_size);
15      tesString (short value, int n=initial_size);
16      tesString (unsigned value, int n=initial_size);
17      tesString (float value, int n=initial_size);
18      tesString (char ch, int n=initial_size);
19  #pragma default_value(initial_size, endblock);
20      operator char*( ) const;
21      operator const char*( ) const;
22      operator int( ) const;
23      operator long( ) const;
24      operator unsigned( ) const;
25      operator short( ) const;
26      operator float( ) const;
27  #pragma default_value(initial_size,block,
28                       ValueUseNumber=default_value*usenumber,
29                       ValueLoopNest=default_value*4*loopnest,
30                       ValueUse=default_value*4,
31                       ValueTotalBytes(1)=totalbytes(1) )
31  // Total bytes for first (1) argument
32      tesString& operator += (const tesString& s);
33      tesString& operator += (const char* s);
34  #pragma default_value(initial_size, endblock);
35      tesString& operator = (const char* s);
36      tesString& operator = (const tesString& s);
37      friend int operator==(const tesString &x,const char *s);
38      friend int operator==(const tesString &x,const tesString &y);
39      friend int operator!=(const tesString &x,const char *s);
40      friend int operator!=(const tesString &x,const tesString &y);
41      friend int operator<(const tesString &x,const char *s);
42      friend int operator<(const tesString &x,const tesString &y);
43      friend int operator<=(const tesString &x,const char *s);
44      friend int operator<=(const tesString &x,const tesString &y);
45      friend int operator>(const tesString &x,const char *s);
46      friend int operator>(const tesString &x,const tesString &y);
47      friend int operator>=(const tesString &x,const char *s);
48      friend int operator>=(const tesString &x,const tesString &y);
49      unsigned length( ) const;
50      tesString& trim( );
51      tesString& trimLeft( );
52      tesString& trimRight( );
53      tesString& upperCase( );
54      tesString& lowerCase( );
55      tesString& padToLength(int padLength, char ch = ' ');
56      tesString& substring (unsigned start_pos) const;
57      tesString& substring (unsigned start_pos, unsigned length) const;
58      int indexOf (char_char int startIndex=0) const;
59      int indexOf (const char *str, int startIndex=0) const;
60      int indexOf (const tesString &str, int startIndex=0) const;
61    protected:
62      I0String _s;
63  };
64  #endif
```

What is claimed is:

1. A computer-implemented method of compiling object-oriented source code, comprising:

Compiling, by a compiler, object-oriented code comprising objects each having at least one associated method; and while compiling the object-oriented code, determining whether a size of each of the objects should be increased from a default size, wherein the determining is performed by the compiler.

2. The method of claim 1, wherein determining whether the size of each of the objects should be increased, comprises:

encountering, in the object-oriented code, an object creation statement for an object; and using dataflow analysis to trace the object and determine an existence of at least one method invocation against the object.

3. The method of claim 2 wherein the method invocation is a method associated with an object, such that, when involved, it consumes object storage leading to the need to increase the size of the object, as determined by the compiler.

4. The method of claim 1, wherein determining whether the size of each of the objects should be increased, comprises:

encountering, in the object-oriented source code, an object creation statement for an object; and determining whether at least one method invocation against the object exists.

5. The method of claim 4, wherein the method invocation comprises:

a computation associated with an object type of the object.

6. The method of claim 1, further comprising:

determining that a size of the object should change; and generating an initial object size value.

7. The method of claim 1, further comprising:

determining that the size of at least one of the objects should be increased from its default size; and increasing the size of at least one object.

8. The method of claim 1, wherein determining whether the size of each of the objects should be increased, comprises:

determining whether an object has an associated consumption method defining a computation for determining an initial object size.

9. A computer readable medium containing a compiler which, when executed, performs an operation comprising:

compiling, by a compiler, object-oriented code comprising objects each having at least one associated method; and while compiling the object-oriented code, determining whether a size of each of the objects should be increased from a default size, wherein the determining is performed by the compiler.

10. The computer readable medium of claim 9, wherein determining whether the size of each of the objects should be increased, comprises:

encountering, in the object-oriented code, an object creation statement for an object; and using dataflow analysis to trace the object and determine an existence of at least one method invocation against the object.

11. The computer readable medium of claim 10, wherein the method invocation is a method associated with an object, such that, when involved, it consumes object storage leading to the need to increase the size of the object, as determined by the compiler.

12. The computer readable medium of claim 9, wherein determining whether the size of each of the objects should be increased, comprises:
 encountering, in the object-oriented source code, an object creation statement for an object; and
 determining whether at least one method invocation against the object exists.

13. The computer readable medium of claim 12, wherein the method invocation comprises:
 a computation associated with an object type of the object.

14. The computer readable medium of claim 9, further comprising:
 determining that a size of the object should change; and
 generating an initial object size value.

15. The computer readable medium of claim 9, further comprising:
 determining that the size of at least one of the objects should be increased from its default size; and
 increasing the size of at least one object.

16. The computer readable medium of claim 9, wherein determining whether the size of each of the objects should be increased, comprises:
 determining whether an object has an associated consumption method defining a computation for determining an initial object size.

17. An apparatus comprising:
 a memory containing a compiler; and
 a processor which, when executing a compiler, performing an operation comprising:
  a method performed by the compiler of compiling object-oriented source code, comprising:
  compiling, by the compiler, object-oriented code comprising objects each having at least one associated method; and
  while compiling the object-oriented code, determining whether a size of each of the objects should be increased from a default size.

18. The apparatus of claim 17, wherein determining whether the size of each of the objects should be increased, comprises:
 encountering, in the object-oriented code, an object creation statement for an object; and
 using dataflow analysis to trace the object and determine an existence of at least one method invocation against the object.

19. The apparatus of claim 18, wherein the method Invocation is a method associated with an object, such that, when invoked, it consumes object storage leading to the need to increase the size of the object, as determined by the compiler.

20. The apparatus of claim 17, wherein determining whether the size of each of the objects should be increased, comprises:
 encountering, in the object-oriented source code, an object creation statement for an object; and
 determining whether at least one method invocation against the object exists.

21. The apparatus of claim 20, wherein the method invocation comprises:
 a computation associated with an object type of the object.

22. The apparatus of claim 17, further comprising:
 determining that a size of the object should change; and
 generating an initial object size value.

23. The apparatus of claim 17, further comprising:
 determining that the size of at least one of the objects should be increased from its default size; and
 increasing the size of at least one object.

24. The apparatus of claim 17, wherein determining whether the size of each of the objects should be increased is performed by the compiler.

25. The apparatus of claim 17, wherein determining whether the size of each of the objects should be increased, comprises:
 determining whether an object has an associated consumption method defining a computation for determining an initial object size.

* * * * *